(12) United States Patent
Kang et al.

(10) Patent No.: US 11,276,895 B2
(45) Date of Patent: Mar. 15, 2022

(54) TOP CAP FOR SECONDARY BATTERY, SECONDARY BATTERY, AND METHOD FOR MANUFACTURING THE SECONDARY BATTERY

(71) Applicant: LG Chem, Ltd., Seoul (KR)

(72) Inventors: Joon Sup Kang, Daejeon (KR); Joon Sung Bae, Daejeon (KR); Nak Gi Sung, Daejeon (KR); Sung Tae Kim, Daejeon (KR)

(73) Assignee: LG Energy Solution, Ltd.

(*) Notice: Subject to any disclaimer, the term of this patent is extended or adjusted under 35 U.S.C. 154(b) by 0 days.

(21) Appl. No.: 16/970,833

(22) PCT Filed: Dec. 26, 2019

(86) PCT No.: PCT/KR2019/018517
§ 371 (c)(1),
(2) Date: Aug. 18, 2020

(87) PCT Pub. No.: WO2020/149549
PCT Pub. Date: Jul. 23, 2020

(65) Prior Publication Data
US 2020/0381680 A1 Dec. 3, 2020

(30) Foreign Application Priority Data
Jan. 14, 2019 (KR) ........................ 10-2019-0004804

(51) Int. Cl.
*H01M 50/152* (2021.01)
*H01M 10/04* (2006.01)
(Continued)

(52) U.S. Cl.
CPC ....... *H01M 50/152* (2021.01); *H01M 10/049* (2013.01); *H01M 10/446* (2013.01); *H01M 50/172* (2021.01); *H01M 50/183* (2021.01)

(58) Field of Classification Search
CPC . H01M 50/152; H01M 50/183; H01M 50/172
See application file for complete search history.

(56) References Cited

U.S. PATENT DOCUMENTS

2011/0111277 A1* 5/2011 Bessho ................ H01M 4/661
429/94

FOREIGN PATENT DOCUMENTS

| EP | 0798793 A2 | 10/1997 |
|----|------------|---------|
| GB | 2080012 A  | 1/1982  |

(Continued)

OTHER PUBLICATIONS

International Search Report for Application No. PCT/KR2019/018517, dated Apr. 14, 2020, pp. 1-2.
(Continued)

*Primary Examiner* — Olatunji A Godo
(74) *Attorney, Agent, or Firm* — Lerner, David, Littenberg, Krumholz & Mentlik, LLP

(57) ABSTRACT

A top cap for a secondary battery includes a circumferential area which defines an outer circumferential surface of the top cap, a central area which defines a central portion of the top cap, a connection area which connects the circumferential area to the central area, and a protrusion area which protrudes downward from the circumferential area, the central area, or the connection area. The top cap is assembled with a battery case, an electrode assembly positioned therein, and a through-hole formation member to form a secondary battery, in which at least a portion of the protrusion area of the top cap is positioned within a through-hole of the through-hole formation member.

18 Claims, 6 Drawing Sheets

(51) Int. Cl.
*H01M 10/44* (2006.01)
*H01M 50/172* (2021.01)
*H01M 50/183* (2021.01)

(56) References Cited

FOREIGN PATENT DOCUMENTS

| | | | |
|---|---|---|---|
| JP | H05036752 U | | 5/1993 |
| JP | H05144425 A | | 6/1993 |
| JP | 2005259355 A | | 9/2005 |
| JP | 2010186648 A | | 8/2010 |
| JP | 2013084480 | * | 5/2013 |
| JP | 2013084480 A | | 5/2013 |
| JP | 2014157723 A | | 8/2014 |
| KR | 100346385 B1 | | 8/2002 |
| KR | 20080049544 A | | 6/2008 |
| KR | 20140106328 A | | 9/2014 |
| KR | 20150037311 A | | 4/2015 |
| KR | 20170095592 A | | 8/2017 |
| KR | 20180061463 A | | 6/2018 |
| KR | 20180131798 A | | 12/2018 |
| WO | 00011734 A1 | | 3/2000 |

OTHER PUBLICATIONS

Extended European Search Report including Written Opinion for Application No. 19910232.8 dated Mar. 4, 2021, pp. 1-7.

* cited by examiner

TOP CAP FOR SECONDARY BATTERY, SECONDARY BATTERY, AND METHOD FOR MANUFACTURING THE SECONDARY BATTERY

CROSS-REFERENCE TO RELATED APPLICATIONS

The present application is a national phase entry under 35 U.S.C. § 371 of International Application No. PCT/KR2019/018517 filed Dec. 26, 2019, which claims the benefit of the priority of Korean Patent Application No. 10-2019-0004804, filed on Jan. 14, 2019, which are hereby incorporated by reference in their entirety.

TECHNICAL FIELD

The present invention relates to a top cap for a secondary battery, a secondary battery, and a method for manufacturing the secondary battery, and more specifically, to a top cap for a secondary battery, a secondary battery, and a method for manufacturing the secondary battery, capable of improving sealing performance of the secondary battery when compared to the related art.

BACKGROUND ART

Secondary batteries that are repeatedly chargeable and dischargeable may be classified into a pouch type secondary battery, a prismatic type secondary battery, a cylindrical type secondary battery, or the like, depending on structures and manufacturing methods thereof.

Among these types, the cylindrical type secondary battery generally has a structure in which an electrode assembly is accommodated within a cylindrical battery can, and a top cap is coupled to an upper portion of the battery can.

Here, a method for manufacturing a secondary battery generally includes an activation process of charging the electrode assembly to activate the electrode assembly. During such an activation process, a gas is generated from an electrolyte or the like. A pressure within the secondary battery increases due to the gas.

However, according to the related art, a top cap is coupled to an upper portion of a battery can, and the inside of the secondary battery is sealed. Then, an activation process of a cylindrical type secondary battery is performed. As a result, a gas generated during the activation process may not be discharged to the outside, and thus constituents such as the battery can within the secondary battery may be damaged, or the secondary battery may explode.

DISCLOSURE OF THE INVENTION

Technical Problem

A problem to be solved by the present invention is to discharge a gas, which is generated within a secondary battery during an activation process in a secondary battery manufacturing process, thereby improving stability of the secondary battery.

Technical Solution

According to a first aspect of the present invention in order to achieve the object described above, a top cap for a secondary battery is provided, the top cap including: a circumferential area which defines an outer circumferential surface of the top cap; a central area which defines a central portion of the top cap; a connection area configured to connect the circumferential area to the central area; and a protrusion area which protrudes downward from the circumferential area, the central area, or the connection area.

The central area may have a disc shape, and the protrusion area may protrude downward from a center of the central area.

The protrusion area may include an I-shaped rod portion extending downward.

The protrusion area may further include a protrusion portion provided on a side surface of the rod portion.

The protrusion area may include a zigzag-shaped zigzag portion extending downward.

According to a second aspect of the present invention in order to achieve the object described above, a secondary battery is provided, including: a battery case having an opened upper portion; an electrode assembly provided within the battery case; a through-hole formation member which is provided above the electrode assembly and in which a through-hole is defined; and the top cap for the secondary battery, which is coupled to the upper portion of the battery case, wherein at least a portion of the protrusion area is inserted into the through-hole.

The secondary battery may further include a sheet-shaped sealing sheet which is provided between the protrusion area and the through-hole and of which at least a portion is inserted into the through-hole.

The through-hole formation member may include at least one of a PTC element or a cap plate.

According to a third aspect of the present invention in order to achieve the object described above, a method for manufacturing a secondary battery is provided, the method including: a step of providing a battery case having an opened upper portion; a step of accommodating an electrode assembly within the battery case; a step of providing, above the electrode assembly, a through-hole formation member in which a through-hole is defined; a step of coupling a top cap to the upper portion of the battery case, wherein the top cap is positioned above the through-hole formation member and includes a protrusion area that protrudes downward and has a cross-section corresponding to the through-hole; a charging step of charging the electrode assembly; and a sealing step of allowing the protrusion area to move downward and allowing the protrusion area to seal the through-hole of the through-hole formation member.

Before the sealing step, the method may further include a step of providing a sheet-shaped sealing sheet above the through-hole of the through-hole formation member, wherein, in the sealing step, as the protrusion area moves downward, at least a portion of the sealing sheet is inserted into the through-hole of the through-hole formation member.

Advantageous Effects

According to the present invention, the gas, which is generated within the secondary battery during the activation process in the secondary battery manufacturing process, is discharged, and thus the stability of the secondary battery may be improved.

MODE FOR CARRYING OUT THE INVENTION

Hereinafter, a structure of a top cap for a secondary battery according to the present invention will be described with reference to the drawings.

Top Cap for Secondary Battery

Figure 1:
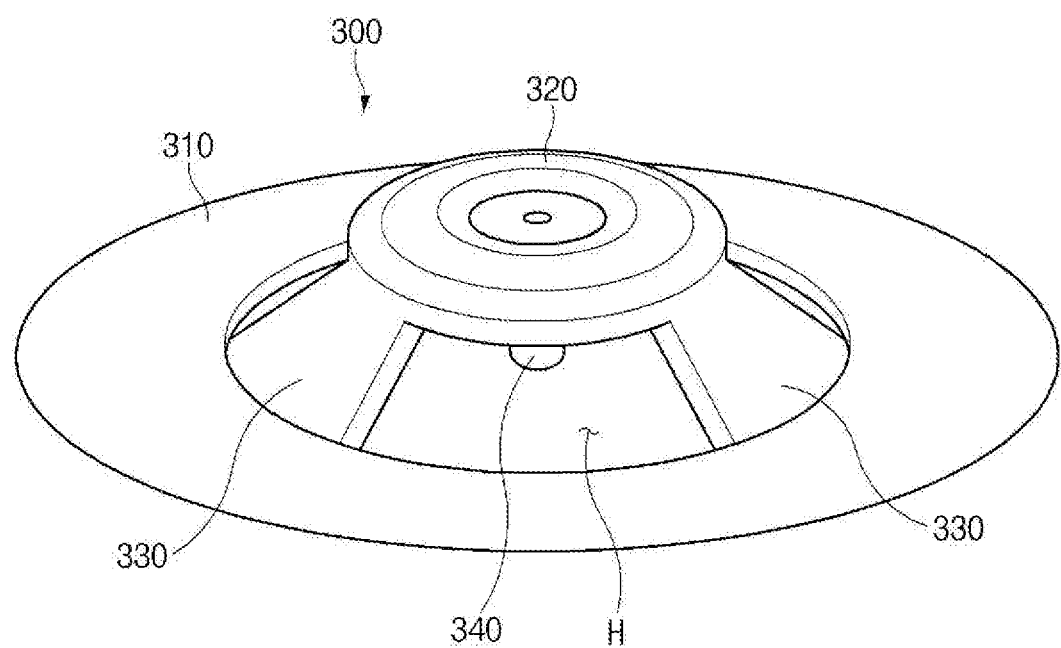
FIG. 1 is a perspective view illustrating a structure of a top cap for a secondary battery according to a first embodiment of the present invention.
Figure 2:
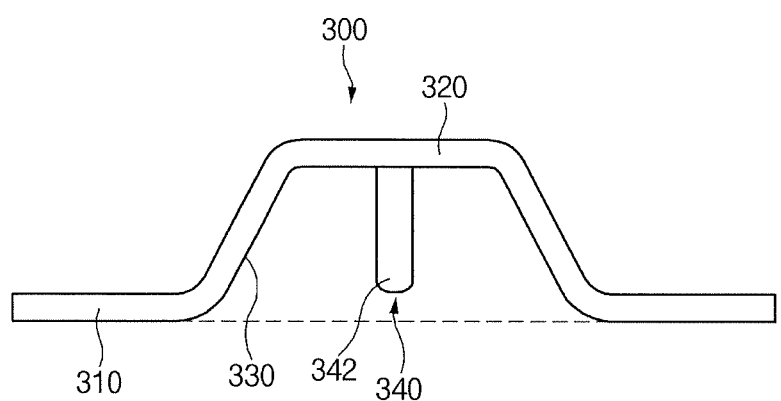
FIG. 2 is a side cross-sectional view illustrating the structure of the top cap for the secondary battery according to the first embodiment of the present invention.

FIG. 1 is a perspective view illustrating a structure of a top cap for a secondary battery according to a first embodiment of the present invention, and FIG. 2 is a side cross-sectional view illustrating the structure of the top cap for the secondary battery according to the first embodiment of the present invention.

As illustrated in FIGS. 1 and 2, a top cap 300 for a secondary battery according to the first embodiment of the present invention may include a circumferential area 310 which defines an outer circumferential surface of the top cap 300, a central area 320 which defines a central portion of the top cap 300, and a connection area 330 which connects the circumferential area 310 to the central area 320. As illustrated in FIGS. 1 and 2, the central area 320 of the top cap 300 according to the first embodiment of the present invention may protrude upward, and the connection area 330 may define a stepped portion of the top cap 300. Also, the connection area 330 may be divided into several parts, and the several parts may be spaced apart from each other. At least one open area H may be provided between the parts of the connection area 330 of the top cap 300. In FIG. 1, the circumferential area 310 and the central area 320 of the top cap 300 are illustrated as having a ring shape and a disc shape, respectively. However, the shapes of the circumferential area 310 and the central area 320 are not limited to those of FIG. 1.

Each of the circumferential area 310, the central area 320, and the connection area 330 of the top cap 300 may include a ferrous metal. For example, each of the circumferential area 310, the central area 320, and the connection area 330 of the top cap 300 may be made of steel plated with nickel.

Referring to FIGS. 1 and 2 again, the top cap 300 for the secondary battery according to the first embodiment of the present invention may include a protrusion area 340 which protrudes downward from the circumferential area 310, the central area 320, or the connection area 340. FIGS. 1 and 2 illustrate a configuration of the protrusion area 340 which protrudes downward from a center of the disc-shaped central area 320.

As illustrated in FIG. 1, the protrusion area 340 may include an I-shaped rod portion 342 extending downward. For example, the rod portion 342 may have a cylindrical shape. Also, as illustrated in FIG. 2, a lower end of the rod portion 342 may be positioned higher than the bottom surface of the circumferential area 310. This may be understood as that the lower end of the rod portion 342 is positioned above an extension region (see a dash line of FIG. 2) of the bottom surface of the circumferential area 310.

As described later, the protrusion area 340 of the top cap 300 according to the present invention may have a structure which is inserted into a through-hole of a through-hole formation member 200 (see FIG. 6) provided within the secondary battery.

Figure 3:
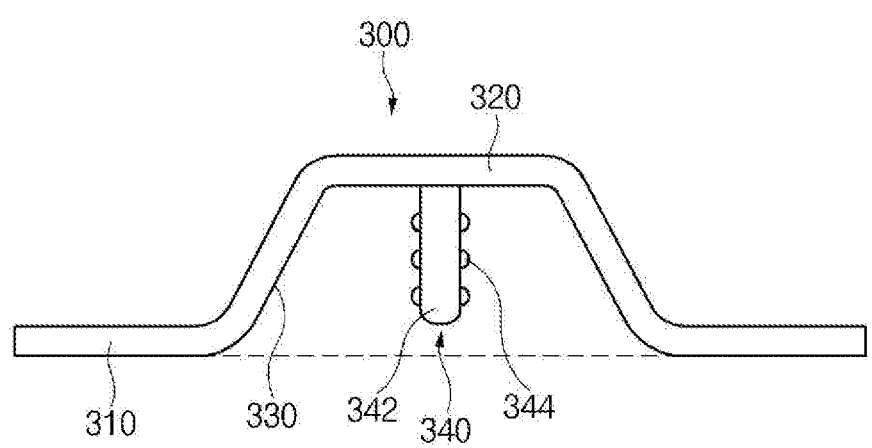
FIG. 3 is a side cross-sectional view illustrating a structure of a top cap for a secondary battery according to a second embodiment of the present invention.

FIG. 3 is a side cross-sectional view illustrating a structure of a top cap for a secondary battery according to a second embodiment of the present invention. Descriptions for a circumferential area 310, a central area 320, and a connection area 330 among constituents of a top cap 300 for a secondary battery according to the second embodiment of the present invention are replaced with the descriptions about the top cap for the secondary battery according to the first embodiment of the present invention.

As illustrated in FIG. 3, a protrusion area 340 of the top cap 300 for the secondary battery according to the second embodiment of the present invention may also include an I-shaped rod portion 342 extending downward, similar to the first embodiment of the present invention. In addition, according to the second embodiment of the present invention, the protrusion area 340 may further include a protrusion portion 344 which is convexly provided on a side surface of the rod portion 342. As illustrated in FIG. 3, a plurality of the protrusion portions 344 may be provided. Also, as illustrated in FIG. 3, a lower end of the rod portion 342 may be positioned higher than the bottom surface of the circumferential area 310.

As described later, the protrusion area 340 of the top cap 300 according to the present invention may have a structure which is inserted into a through-hole of a through-hole formation member 200 (see FIG. 6) provided within the secondary battery. In a case in which the protrusion portion 344 is provided in the protrusion area 340 as in the second embodiment of the present invention, a coupling force of the protrusion area 340 at the through-hole may be improved by the protrusion portion 344.

Figure 4:
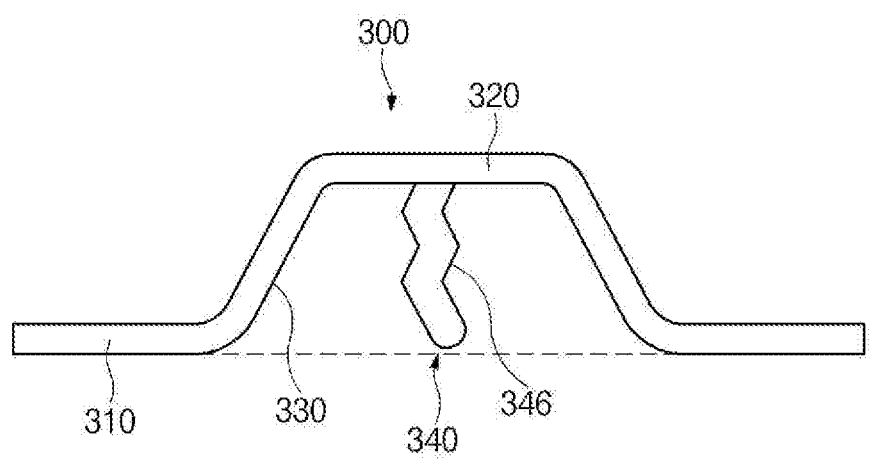
FIG. 4 is a side cross-sectional view illustrating a structure of a top cap for a secondary battery according to a third embodiment of the present invention.

FIG. 4 is a side cross-sectional view illustrating a structure of a top cap for a secondary battery according to a third embodiment of the present invention. Descriptions for a circumferential area 310, a central area 320, and a connection area 330 among constituents of a top cap 300 for a secondary battery according to the second embodiment of the present invention are replaced with the descriptions about the top cap for the secondary battery according to the second embodiment of the present invention.

As illustrated in FIG. 4, a protrusion area 340 of the top cap 300 for the secondary battery according to the third embodiment of the present invention may include a zigzag-shaped zigzag portion 346 extending downward. A case in which the zigzag portion 346 has an angularly bent shape is illustrated in FIG. 4. However, unlike the above, the zigzag portion 346 may have a wavingly bent shape including curved surfaces. Also, as illustrated in FIG. 4, a lower end of the zigzag portion 346 may be positioned higher than the bottom surface of the circumferential area 310.

As described later, the protrusion area 340 of the top cap 300 according to the present invention may have a structure which is inserted into a through-hole of a through-hole formation member 200 (see FIG. 6) provided within the secondary battery. In a case in which the zigzag portion 346 is provided in the protrusion area 340 as in the third embodiment of the present invention, a coupling force of the protrusion area 340 at the through-hole may be improved.

Hereinafter, a structure of the secondary battery according to the present invention will be described with reference to the descriptions above and the drawings.

Secondary Battery

Figure 5:
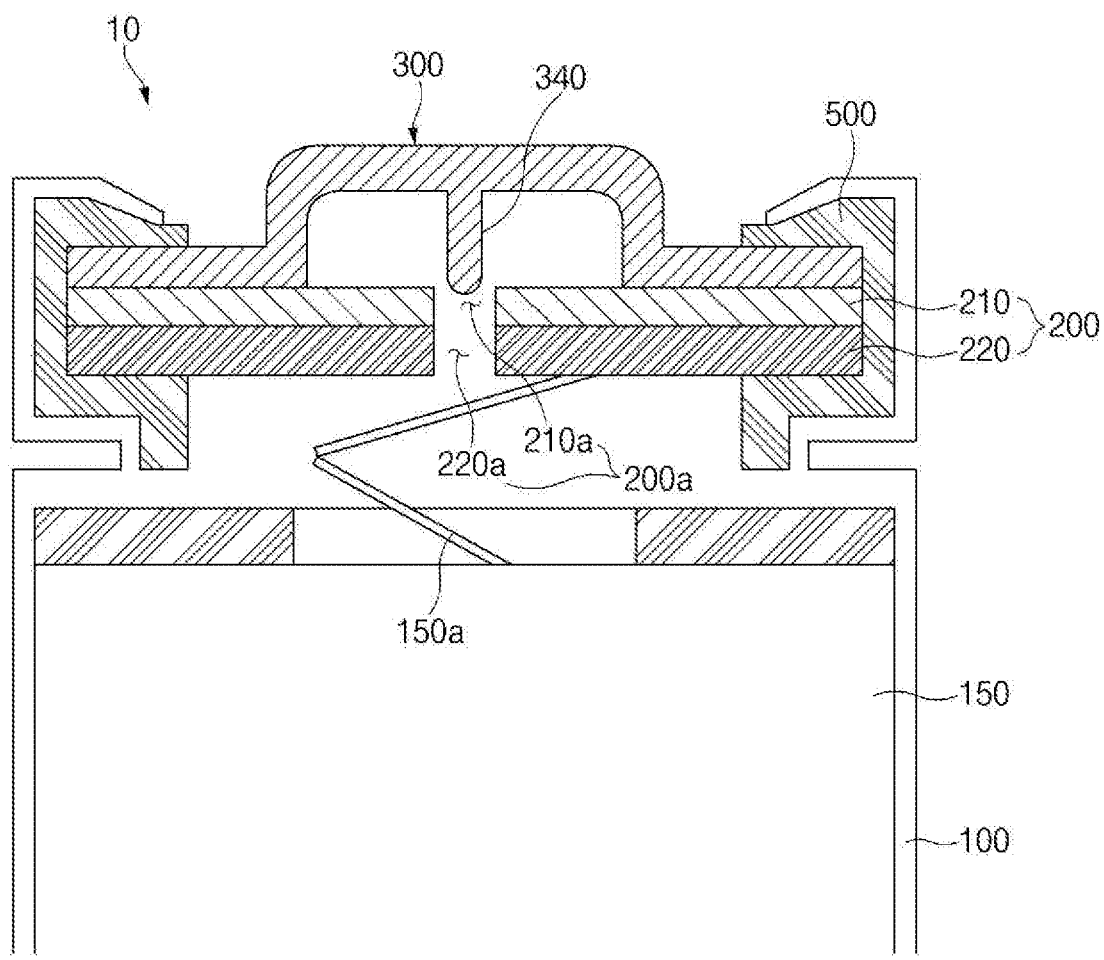
FIG. 5 is a side cross-sectional view illustrating a configuration before a sealing step is performed by a protrusion area in a method for manufacturing a secondary battery according to the present invention.
Figure 6:
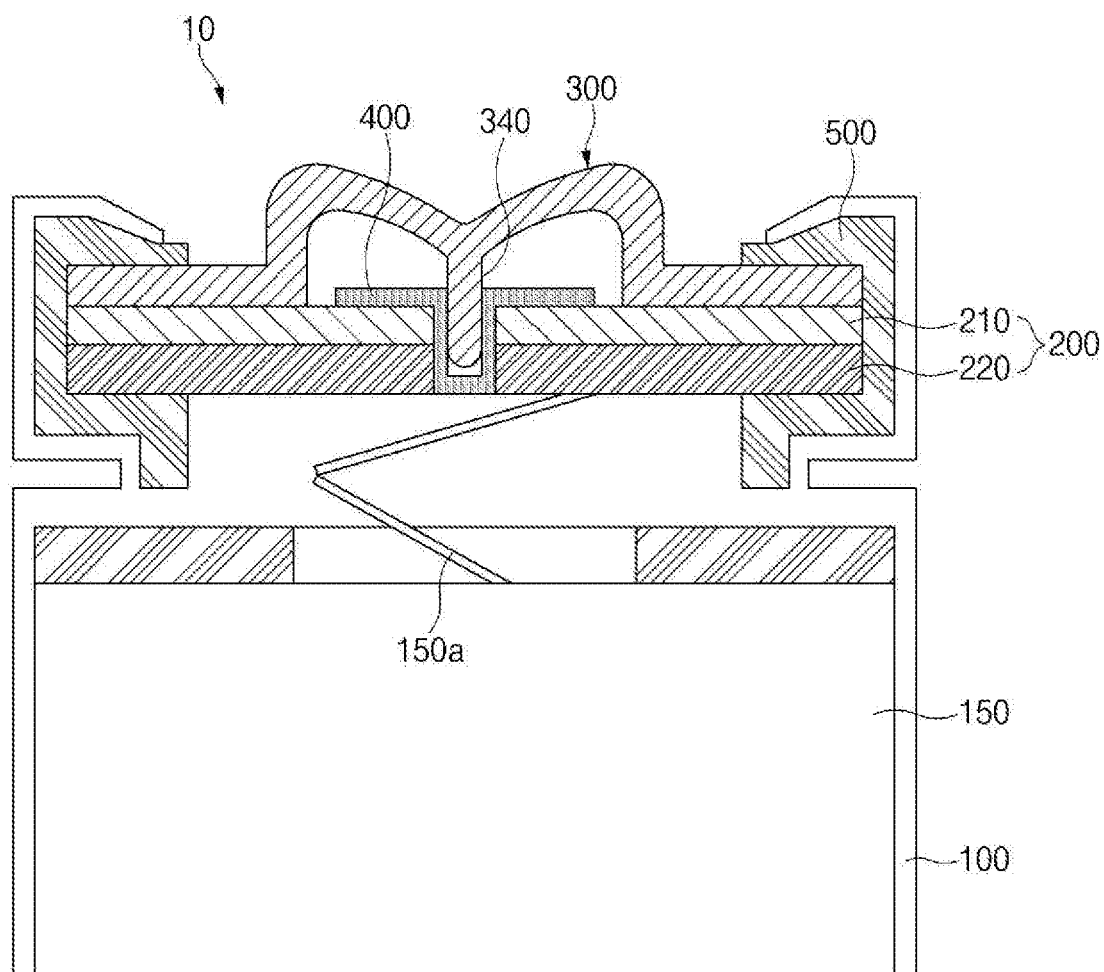
FIG. 6 is a side cross-sectional view illustrating a configuration after manufacturing of the secondary battery is completed by performing the sealing step using the protrusion area in the method for manufacturing the secondary battery according to the present invention.

FIG. 5 is a side cross-sectional view illustrating a configuration before a sealing step is performed by a protrusion area in a method for manufacturing a secondary battery according to the present invention, and FIG. 6 is a side cross-sectional view illustrating a configuration after manufacturing of the secondary battery is completed by performing the sealing step using the protrusion area in the method for manufacturing the secondary battery according to the present invention.

Descriptions for a structure of a top cap 300 are replaced with the above descriptions about the structures of the top caps 300 according to the first to third embodiments of the present invention.

As illustrated in FIGS. 5 and 6, a secondary battery 10 according to the present invention may include a battery case 100 having an opened upper portion and an electrode assembly 150 provided within the battery case 100. Although the battery case 100 has a cylindrical shape, the battery case 100 may have various shapes within a range which is not contradictory to features of the present invention.

Referring to FIGS. 5 and 6 again, the top cap 300 may be coupled to an upper portion of the battery case 100. In order to establish more firm coupling between the battery case 100 and the top cap 300, a gasket 500 may be provided between an inner surface of the upper portion of the battery case 100 and an outer surface of the top cap 300.

Also, the secondary battery 10 according to the present invention may further include a through-hole formation member 200 which is provided above the electrode assembly and in which a through-hole 200a is defined.

The through-hole formation member 200 may include a PTC element 210, in which electrical resistance rapidly increases when a temperature increases, and thus current of the secondary battery is interrupted, or include a cap plate 220. FIGS. 5 and 6 illustrate a structure in which, in the secondary battery 10, the electrode assembly 150 is connected to the cap plate 220 through an electrode tap 150a, and the PTC element 210 is provided on the cap plate 220.

Referring to FIG. 6 again, in the secondary battery 10 according to the present invention, at least a portion of the protrusion area 340 may be inserted into the through-hole 200 defined in the through-hole formation member 200. FIG. 6 illustrates a configuration in which the protrusion area 340 is inserted into the through-hole 210a of the PTC element 210 and the through-hole 220a of the cap plate 220. According to the present invention, as the protrusion area 340 of the top cap 300 is inserted into the through-hole 200a defined in the through-hole formation member 200, sealing performance in the inside of the secondary battery 10 may be secured.

Here, in order for the protrusion area 340 to be smoothly inserted into the through-hole 200a, a shape of a horizontal cross-section of the protrusion area 340 may correspond to a shape of the through-hole 200a. Here, a feature in which 'the shape of the horizontal cross-section of the protrusion area corresponds to the shape of the through-hole' indicates that the protrusion area 340 has a surface area enough to be inserted into the through-hole 200a. However, this feature does not indicate only a case in which the shape of the horizontal cross-section of the protrusion area is similar to the shape of the through-hole.

Here, the surface area of the horizontal cross-section of the protrusion area 340 may be less than the surface area of the through-hole 200a. In this case, the protrusion area 340 may be smoothly inserted into the through-hole 200a. However, unlike the above, the surface area of the horizontal cross-section of the protrusion area 340 may be greater than the surface area of the through-hole 200a. In this case, the protrusion area 340 is inserted into the through-hole 200a in an interference fit manner, and thus sealing performance of the secondary battery 10 may be improved.

Also, the secondary battery 10 according to the present invention may further include a sheet-shaped sealing sheet 400 which is provided between the protrusion area 340 and the through-hole 200a and of which at least a portion is inserted into the through-hole 200a. In a case in which the sealing sheet 400 is provided, the sealing performance in the inside of the secondary battery 10 may be further improved.

Here, according to the present invention, the protrusion area 340 may include a plastic material. More preferably, the material of the protrusion area 340 may be the same as the material of the gasket 500. In a case in which the material of the protrusion area 340 may be the same as the material of the gasket 500, it is unnecessary to employ a separate material to manufacture the protrusion area 340, and thus costs required to manufacture the secondary battery 10 according to the present invention may be reduced as much as possible.

Hereinafter, a method for manufacturing the secondary battery according to the present invention will be described with reference to the descriptions above and the drawings.

Method for Manufacturing Secondary Battery

Referring to FIGS. 1 to 6, a method for manufacturing a secondary battery may include a step of providing a battery case 100 having an opened upper portion; a step of accommodating an electrode assembly 150 within the battery case 100, a step of providing, above the electrode assembly 150, a through-hole formation member 200 in which a through-hole 200a is defined, and a step of coupling a top cap 300 to an upper portion of the battery case 100. The top cap 300 is positioned above the through-hole formation member 200 and includes a protrusion area 340 that protrudes downward from a circumferential area 310, a central area 320, or a connection area 330 and has a horizontal cross-section corresponding to the through-hole 200a.

Also, the method for manufacturing the secondary battery according to the present invention may further include a charging step of charging the electrode assembly 150 to activate the electrode assembly 150, and a sealing step of pressing a top surface of the top cap 300 to move the protrusion area 340 downward and allowing the protrusion area 340 to seal the through-hole 200a of the through-hole formation member 200.

According to the present invention, the electrode assembly 150 is activated in a state in which the through-hole 200a of through-hole formation member 200 is open, and a gas generated within the secondary battery is discharged. Then, the through-hole 200a is sealed by the protrusion area 340. Therefore, damage to constituents within the secondary battery or explosion of the secondary battery due to the gas generated during an activation process of the electrode assembly may be prevented.

Also, the method for manufacturing the secondary battery according to the present invention may further include a step, which is performed before the sealing step, of providing a sheet-shaped sealing sheet 400 above the through-hole 200a of the through-hole formation member 200. In this case, as the protrusion area 340 moves downward in the sealing step, at least a portion of the sealing sheet 400 may be inserted into the through-hole 200a of the through-hole formation member 200.

Here, in order for the protrusion area 340 of the top cap 300 according to the present invention to effectively seal the through-hole 200a, the top cap may be made of a material having sufficient flexibility so that a top surface of the top cap 300 is deformed when the top surface of the top cap 300 is pressed in the sealing step. Also, the top cap 300 may be made of a material having sufficient rigidity so that the top surface of the top cap 300 does not return to the original position thereof due to the inner pressure of the secondary battery 10.

Although the present invention is described by specific embodiments and drawings as described above, the present invention is not limited thereto, and it is obvious that various changes and modifications may be made by a person skilled in the art to which the present invention pertains within the technical idea of the present invention and equivalent scope of the appended claims.

The invention claimed is:

1. A top cap for a secondary battery, the top cap comprising:
   a circumferential area which defines an outer circumferential surface of the top cap;
   a central area which defines a central portion of the top cap;
   a connection area connecting the circumferential area to the central area, the connection area being shaped such that the top cap defines a concavity, and the connection area having at least one opening therethough such that gas within the concavity can pass out of the concavity via the at least one opening; and
   a protrusion area which protrudes downwardly into the concavity away from the circumferential area, the central area, or the connection area.

2. The top cap of claim 1, wherein the central area has a disc shape, and
   the protrusion area protrudes downwardly away from a center of the central area.

3. The top cap of claim 1, wherein the protrusion area comprises a straight-shaped rod portion extending downward.

4. The top cap of claim 3, wherein the protrusion area further comprises a protrusion portion which protrudes convexly from a side surface of the rod portion.

5. The top cap of claim 1, wherein the protrusion area comprises a zigzag-shaped zigzag portion extending downward.

6. A secondary battery comprising:
   a battery case having an open upper portion;
   an electrode assembly positioned within the battery case;
   a through-hole formation member which is positioned above the electrode assembly and in which a through-hole is defined; and
   the top cap of claim 1, the top cap being coupled to the upper portion of the battery case,
   wherein at least a portion of the protrusion area is positioned within the through-hole.

7. The secondary battery of claim 6, further comprising a sheet-shaped sealing sheet provided between the protrusion area and the through-hole, at least a portion of the sealing sheet being positioned within the through-hole.

8. The secondary battery of claim 6, wherein the through-hole formation member comprises at least one of a PTC element and a cap plate.

9. A method for manufacturing a secondary battery, the method comprising:
   a step of providing a battery case having an open upper portion;
   a step of positioning an electrode assembly within the battery case;
   a step of positioning, above the electrode assembly, a through-hole formation member in which a through-hole is defined;
   a step of coupling a top cap to the upper portion of the battery case, wherein the top cap is positioned above the through-hole formation member and includes a protrusion area that protrudes downward, the protrusion area having a cross-section corresponding to the through-hole;
   a charging step of charging the electrode assembly; and
   a sealing step of moving the protrusion area downward so that the protrusion area seals the through-hole of the through-hole formation member.

10. The method of claim 9, further comprising, before the sealing step, a step of providing a sheet-shaped sealing sheet above the through-hole of the through-hole formation member,
    wherein, in the sealing step, as the protrusion area moves downward, at least a portion of the sealing sheet moves into the through-hole of the through-hole formation member.

11. The top cap of claim 1, wherein a terminal end of the protrusion area is positioned between the circumferential area and the central area in an undeformed state of the top cap.

12. The method of claim 9, further comprising a step of discharging gas generated within the battery case after the step of charging the electrode assembly, the gas being discharged through the top cap.

13. The method of claim 12, wherein the protrusion area seals the through-hole in such a way that engagement between a periphery of the protrusion area and the through-hole forms a seal that prevents the gas from passing through the through-hole past the protrusion area.

14. The method of claim 13, wherein the seal is formed by contact between the periphery of the protrusion area and an inner surface of the through-hole.

15. The method of claim 13, wherein the seal is formed by contact between the periphery of the protrusion area and a sealing sheet positioned within the through-hole.

16. A secondary battery comprising:
    a battery case having a through-hole defined therein; and
    a top cap coupled to the battery case and positioned over the through-hole, the top cap including:
       a circumferential area which defines an outer circumferential surface of the top cap,
       a central area which defines a central portion of the top cap,
       a connection area connecting the circumferential area to the central area, and
       a protrusion area which protrudes downwardly away from the circumferential area, the central area, or the connection area;
    wherein engagement between a periphery of the protrusion area of the top cap and the through-hole forms a seal that prevents gas from passing through the through-hole past the protrusion area.

17. The secondary battery of claim 16, wherein the seal is formed by contact between the periphery of the protrusion area and an inner surface of the through-hole.

18. The secondary battery of claim 16, wherein the seal is formed by contact between the periphery of the protrusion area and a sealing sheet positioned within the through-hole.

* * * * *